United States Patent [19]

Cordo

[11] 3,710,435
[45] Jan. 16, 1973

[54] METHOD OF ASSEMBLY AND BONDING

[75] Inventor: Francis Vincent Cordo, Utica, N.Y.

[73] Assignee: General Electric Company

[22] Filed: Nov. 5, 1970

[21] Appl. No.: 87,070

[52] U.S. Cl. ............... 29/470.5, 29/471.1, 29/472.1, 287/189.36 B, 287/189.36 D
[51] Int. Cl. ............................................. B23k 31/02
[58] Field of Search .......... 29/470.5, 471.1, 481, 418, 29/470.7, 472.1, 482; 287/189.36 B, 189.36 D

[56] References Cited

UNITED STATES PATENTS

| 782,056 | 2/1905 | Richardson | 29/470.5 |
| 2,148,427 | 2/1939 | Howard et al. | 29/471.1 |
| 2,249,445 | 7/1941 | Unger | 29/470.5 X |
| 2,798,676 | 7/1957 | Heer | 29/470.5 X |
| 2,932,884 | 4/1960 | Lyon | 29/481 X |
| 2,957,237 | 10/1960 | Regle et al. | 29/470.5 |
| 3,111,859 | 11/1963 | Malone | 29/418 X |
| 3,394,448 | 7/1968 | Meuschotz et al. | 29/418 X |
| 3,460,238 | 8/1969 | Christy et al. | 29/481 |
| 3,501,981 | 3/1970 | Katunich et al. | 29/481 X |

Primary Examiner—J. Spenser Overholser
Assistant Examiner—Richard Bernard Lazarus
Attorney—Irving M. Freedman, Robert P. Cogan, Joseph B. Forman, Frank L. Neuhauser and Oscar B. Waddell

[57] ABSTRACT

A method of joining first and second walls of an article such as a chassis. The edge of a first wall is aligned with a hole in the surface of the second wall. A pin is inserted in the hole to retain the second wall against the first. The pin has a bifurcated portion for gripping the first wall, a plug portion which is friction fit in the hole and a post portion which facilitates handling of the pin. The first and second walls and the pin are bonded, and the post portion is thereafter broken away.

14 Claims, 5 Drawing Figures

PATENTED JAN 16 1973

INVENTOR:
FRANCIS V. CORDO,

BY  Robert P. Cogan

HIS AGENT.

PATENTED JAN 16 1973 3,710,435
SHEET 2 OF 2
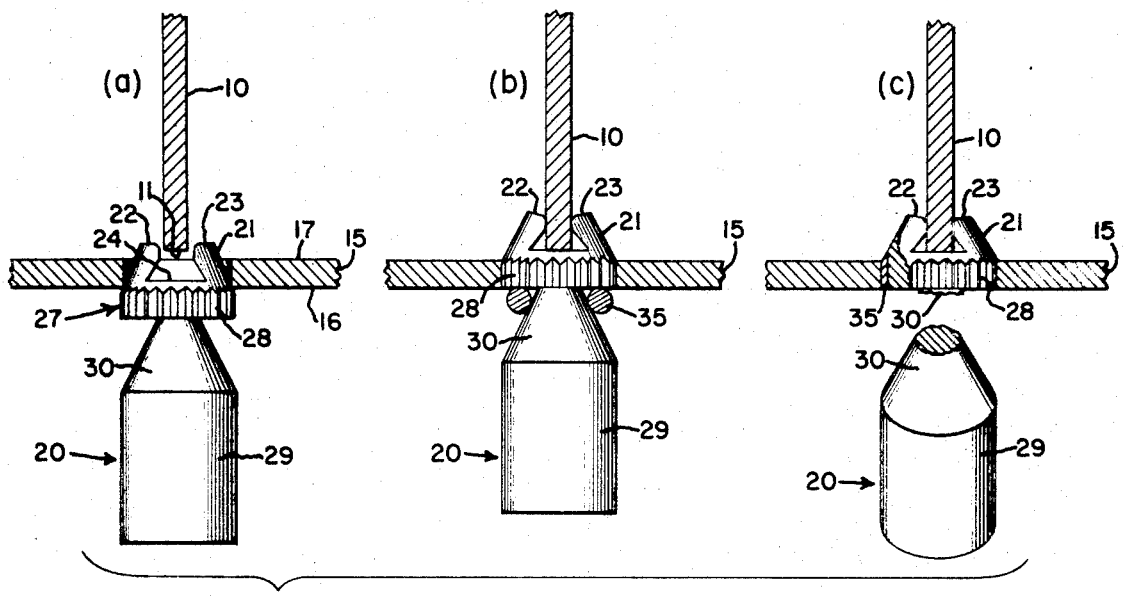
FIG. 3
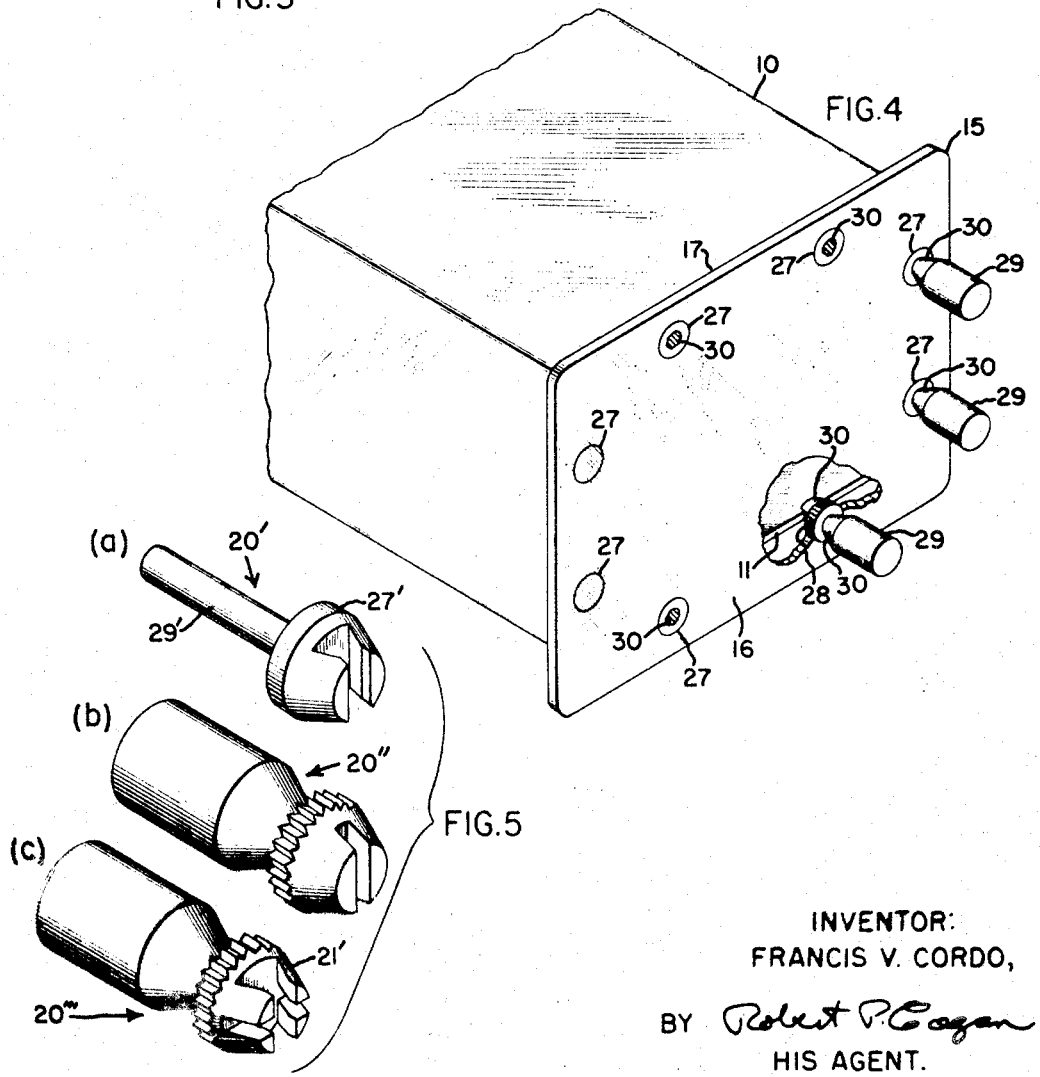
FIG. 4
FIG. 5
INVENTOR:
FRANCIS V. CORDO,
BY Robert P. Cogan
HIS AGENT.

METHOD OF ASSEMBLY AND BONDING

BACKGROUND OF THE INVENTION

This invention relates to processes of mechanical manufacture and more particularly to a method and a means for assembling and joining portions of a structure.

In the construction of brazed, welded, or otherwise bonded structures, such as electronic chassis, a prevalent means of assembling comprises the well-known "tab-and-slot" form of construction. The tabs on one wall of a structure pass through slots in another wall to form an intersecting member. The portions of the tab protruding from the slots must be twisted or otherwise deformed to insure positive contact of the walls during a brazing process. This method of assembling presents several disadvantages. The primary disadvantage is one of tolerances. Center-to-center distances between the tabs and between successive slots must be held to close tolerances to insure accurate alignment between walls. Tabs must often be filed down before fitting into slots. Further, many practical problems arise in design and manufacturing. Such problems include checking out dimensions for compatibility of mating parts, difficulty in generating numerical control tapes for automatic operation of such a method of assembly, and machining operations required on the tabs after assembly.

Further, since slot formation generally requires the use of narrow punches, tool breakage is a common factor in their construction.

SUMMARY OF THE INVENTION

It is therefore an object of the present invention to provide a highly simplified method of assembling a mechanical structure.

It is a more specific object of the present invention to provide a method of mechanical assembly in which the criticality of tolerances between portions of the assembly at which retaining means are utilized is minimized.

It is another object of the present invention to provide a process of mechanical assembly in which preparation of the pieces to be joined is greatly simplified.

It is yet another object of the present invention to provide a method of mechanical assembly in which the need for post-bonding machining is minimized.

It is a further object of the present invention to provide a retaining means utilized to maintain first and second pieces to be joined during the assembly process to facilitate the provision of a process of the type described.

Briefly stated, in accordance with the present invention, there is provided a method for assembling a mechanical structure and an article for use therewith. In one form of the invention, the edge of a first wall is aligned with a hole in the surface of a second wall. A pin is inserted in the hole to retain the second wall against the first. The pin has a bifurcated portion for gripping this first wall, a fixturing portion which is friction fit in the hole and, in one form, a post portion which facilitates handling of the pin. The first and second walls and the pin are bonded, and any necessary post-bonding machining is performed.

DESCRIPTION OF THE DRAWINGS

The means through which the foregoing objects and features of novelty are accomplished are pointed out with particularity in the claims forming the concluding portion of the specification. The invention, both as to its organization and manner of operation, may be further understood by reference to the following description taken in connection with the following drawings.

Of the Drawings:

FIG. 3 is a partial view of assembled elements illustrated in FIG. 2 demonstrating the method of assembly;

FIG. 4 is an isometric view of an assembly utilizing the present invention in its construction; and FIG. 5 is an illustration of further forms of pins which may be utilized in the process of the present invention.

DESCRIPTION OF THE PREFERRED EMBODIMENTS

In both prior art methods of mechanical assembly and in that of the present invention, the following must be accomplished: pieces suitable for joining are provided; retaining means maintain the pieces in their desired juxtaposition; bonding is performed; and post-bonding machine is completed.

Figure 1:
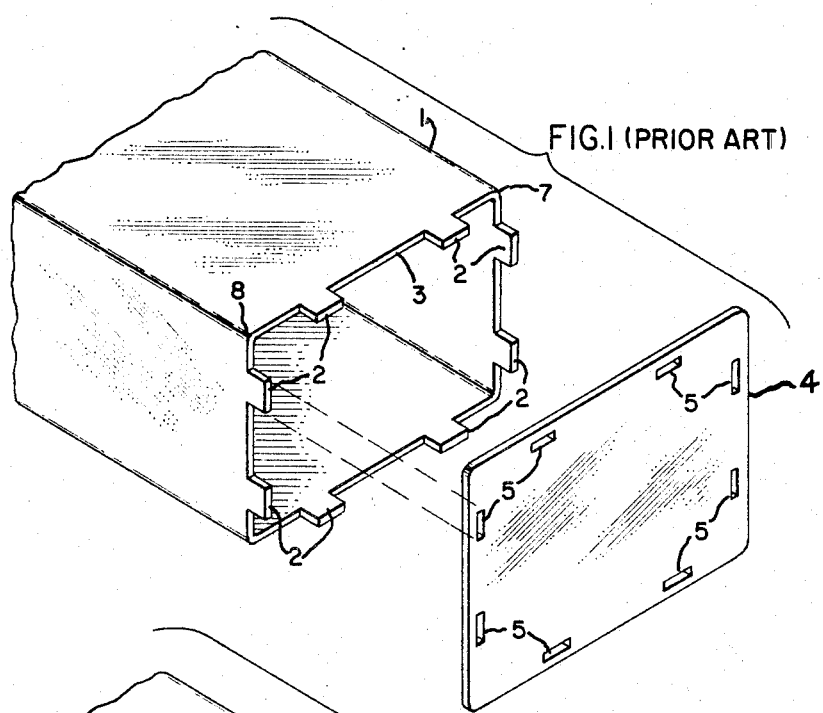
FIG. 1 is an exploded isometric view of a prior art assembly.

In FIG. 1, there is illustrated an exploded isometric view of a prior art assembly. A first wall 1 with a plurality of tabs 2 extending laterally from an edge 3 is provided for joining to a second wall 4 having slots 5 formed therein. In the example of FIG. 1, bends 7 and 8 are formed in the wall 1 so that it is substantially U-shaped. This form of construction presents several disadvantages. The tabs 2 and the slots 5 must be aligned within relatively close tolerances. Further, in addition to the above-described disadvantages it will be recognized by those skilled in the drafting art that it is virtually impossible to provide dimensioning from any of the tabs 2 to a bend 7 or 8 when providing mechanical drawings of the wall 1. Also, in order to provide proper alignment between the tabs 2 and the slots 5, forming of the bends 7 and 8 is a critical mechanical operation.

Figure 2:
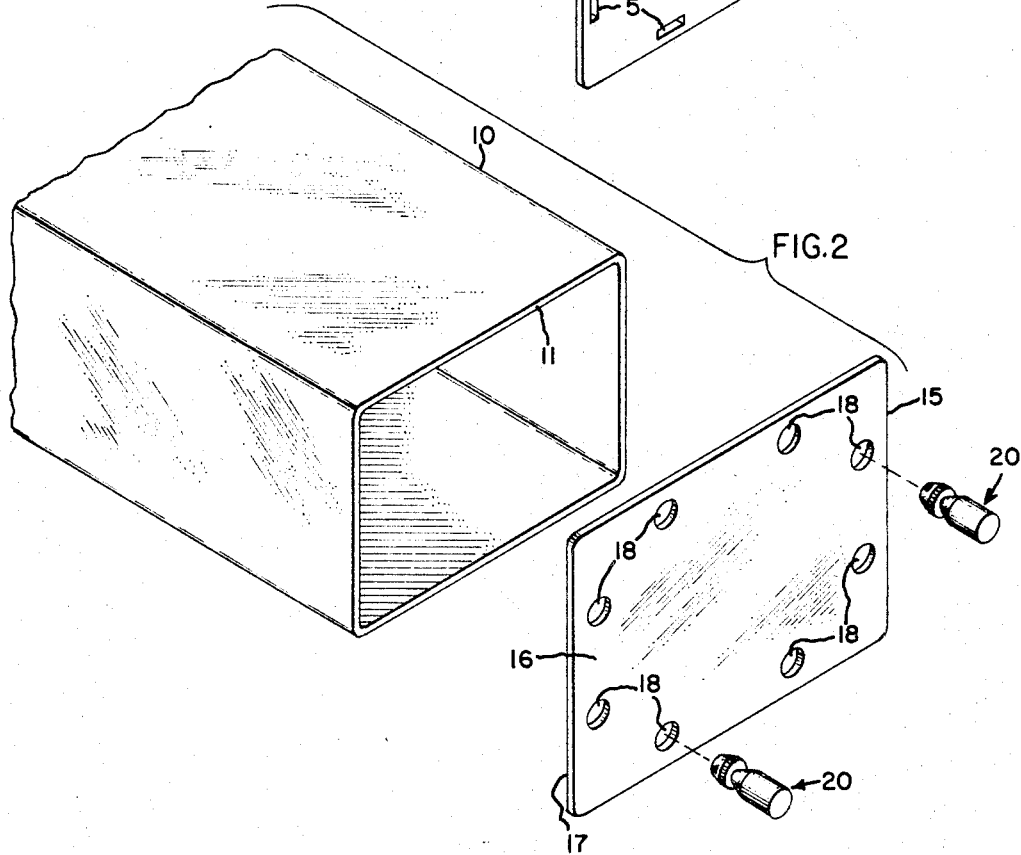
FIG. 2 is an isometric view of components utilized in the process contemplated by the present invention.

In accordance with the present invention as illustrated in FIG. 2, there is provided a wall 10 having an edge 11. The wall 10 is substantially U-shaped in the present embodiment, but may comprise any convenient shape. A wall 15 is provided having a first surface 16 and a second surface 17 on the other side of the wall 15. The surface 16 is that which faces the reader in FIG. 2. The wall 15 is provided with holes 18 aligned with the edge 11 of the wall 10. Any number of holes 18 and placement of them which are determined by one skilled in the art may be provided to retain the wall 10 to the wall 15. It should be noted that the holes in wall 15 need only be aligned within one degree of freedom rather than within two, as must be slots 5 in FIG. 1. At least one retaining means, comprising a pin 20 in the present embodiment, is provided in order to retain the walls 10 and 15 in desired juxtaposition prior to bonding. In one form, a pin 20 comprises a bifurcated, frustroconical retaining portion 21 having first and second teeth 22 and 23 and a surface 24 parallel to the base of the frustroconical portion 21 and normal to its axis. The teeth 23 and 24 may be formed to a tapered slot. Further, the teeth 23 and 24 may be made resilient. Thus, walls 10 of non-uniform thickness may be accommodated by a pin 20, further minimizing the criticality of tolerances in the present invention. References to the disposition of further portions of the pin 20 are with reference to the axis of the retaining portion 21.

The retaining portion 21 is integral with a fixturing portion 27. The fixturing portion 27 is preferably the same shape as the hole 18 and dimensioned such that an interference fit between the fixturing portion 27 and hole 18 is provided when the pin 20 is inserted into the hole 18. To this end, in the preferred form, the fixturing portion 27 is provided with teeth 28. Of course, the fixturing portion 27 and hole 18 need not be the same shape. If one were particularly stubborn, he could set about to fit a square peg in a round hole. In the preferred form, the fixturing portion 27 should be dimensioned to be substantially the same depth as the hole 18. The depth of the portion 27 is chosen consistently with good bonding practice. This facilitates bonding and minimizes the amount of post-bonding machining necessary to have the fixturing portion 27 become part of the wall 15 in a completed assembly constructed in accordance with the present invention.

In the preferred form, an axially extending post 29 is fixed to the fixturing portion 27 and may be provided with a tapered portion 30 in the immediate vicinity of the fixturing portion 27. The post 29 facilitates handling of the pin 20 prior to the subject process which is described with respect to FIG. 3. In other forms of the invention, the post 29 need not be included as a part of the pin 20.

Sequence of the Process

FIGS. 3 a, b, c each comprise a partial view of FIG. 2, the walls 10 and 15 being shown in cross-section and one of the holes 18 being illustrated. An elevation of one of the pins 20 is illustrated in FIG. 3. As illustrated in FIGS. 3 a and b, the walls 10 and 15 are initially maintained in desired alignment by any convenient means, for example by a fixture (not shown). The pin 20 is inserted into the wall 15. More specifically, the fixturing portion 27 is inserted, staked or friction fit, for example, into the hold 18 by any convenient means. Such convenient means may, for example, comprise an automatic riveting machine. Alternatively, where no hole 18 is provided, the retaining portion 21 may be utilized to pierce the wall 15. The fixturing portion 27 may be dimensioned and inserted to be flush with the surface 16 and protrude or be recessed from the wall 17 in a manner consistent with good bonding practice. The fingers 22 and 23 of the retaining portion 21 grasp the wall 10. It is preferable for the edge 11 of the wall 10 to firmly rest against the surface 24 of the retaining portion 21 and against the surface 17 of the wall 15 for maximum strength in the resulting bond. Alternatively, the pin 20 may be inserted in the wall 15, and the wall 10 may be placed in the retaining portion 21 of the pin 20. This process is repeated until a desired number of pins 20 have each been placed in a hole 18 to sufficiently retain the walls 10 and 15 in their desired position prior to bonding. It should be noted that the purpose of the above-identified steps is to facilitate the production of a bonded assembly.

Bonding is next performed. One form of bonding which may be utilized is brazing. Where brazing is performed, bonding material may be placed around the tapered portion 30 of a post 29 or otherwise provided. The bonding material 35 is sweated between the teeth 28 and the hole 18 into the spaces between the retaining portion 21 and wall 10 and also between the edge 11 of the wall 10 and surface 17 of the wall 15. While dip-brazing is the most convenient form of bonding within the current state of the art, welding may be utilized. Other forms of bonding are compatible with the process of the present invention, depending upon the nature of the materials used.

After the completion of the bonding step, the post 29 (in the embodiments in which it is provided) is broken away, the tapered portion 30 facilitating the ease of this operation, and the post 29 is discarded. This breaking away of post 29 may leave a slightly roughened surface on the retaining portion 27 requiring a minimum of post-bonding machining operation. The post-bonding machining is then performed. FIG. 4 is an illustration of an assembly on a portion of which post-bonding machining has been performed.

The present invention thus provides a process for extremely simplified manufacture of a surface bonded assembly and also provides an extremely useful article, retaining means in the form of the pin 20, for use therewith.

Referring now to FIG. 5 other forms of pin 20 are shown for a purpose of enabling those skilled in the art to devise many other forms of a pin 20 constructed in accordance with the present invention which are not specifically illustrated in the present specification.

In FIG. 5 a there is illustrated a pin 20' having a retaining portion 27' and a post 29'. The retaining portion 27' has no teeth and is retained in the hole 18 by staking in a well-known manner. The entire diameter of the post 29' is the same as that of the narrowest portion of the post 29' of FIG. 2 in order to facilitate handling by a staking and/or inserting tool. FIG. 4b illustrates a pin 20'' not including a post 29. A pin 20''' is illustrated in FIG. 5c having a retaining portion 21' with first and second perpendicularly disposed slots so that one pin 20''' may be used for retaining a wall 10 of a first or second substantially differing thickness.

The present invention thus contemplates the provision of a simplified assembly method of sufficiently maintaining two walls in a desired juxtaposition prior to bonding, bonding, and, if desired, performing post-bonding steps. Further, the present invention provides a pin including a retaining portion and a fixturing portion, and which also may include a post for facilitating handling the pin, a preform of material for use in a bonding process or both.

What is claimed as new and desired to be secured by Letters Patent of the United States is:

1. A method of mechanical assembly comprising the steps of:
   a. providing first and second walls to be joined, a first of said walls having an edge disposed toward a surface of said second wall, and said second wall being provided with a hole aligned with the edge of said first wall;

b. providing a pin including a retaining portion for grasping said first wall, a fixturing portion for fitting in the hole included in said second wall, and a post portion for handling said pin;

c. inserting said pin in the hole of said second wall so that said retaining portion grips said first wall and said fixturing portion is fit in the hole in said second wall; and d. bonding the assembly formed by said first and second walls and said pin.

2. A method according to claim 1 further comprising the step of:

e. detaching the post portion of said pin from the assembly.

3. A method according to claim 2 further comprising the step of:

f. performing post-bonding machining operation on a portion of said pin from which said post is removed.

4. A method according to claim 1 in which the step of fitting said fixturing portion of said pin into the hole of said second wall comprises the step of friction fitting said fixturing portion into the hole, whereby said fixturing portion is maintained in the hole of said second wall by means of an interference fit.

5. A method according to claim 1 in which the step of fitting said fixturing portion into the hole of said second wall comprises the step of staking said fixturing portion into the hole of said second wall.

6. A method of mechanical assembly comprising the steps of:

a. providing first and second walls to be joined, a first of said walls having an edge disposed toward a surface of said second wall, and said second wall being provided with a plurality of holes, each of the holes being aligned with the edge of said first wall;

b. providing a plurality of pins, each of said pins including a retaining portion for grasping said first wall, a fixturing portion for fitting in the hole included in said second wall, and a post portion for handling said pin;

c. inserting each of said pins in one of the holes of said second wall so that said retaining portion of each of said pins grips said first wall and said fixturing portion of each of said pins is fit in one of the holes in said second wall; and d. bonding the assembly formed by said first and second walls and said pin.

7. A method according to claim 6 further comprising the step of:

e. detaching the post portion of each of said pins from the assembly.

8. A method according to claim 7 further comprising the step of:

f. performing post-bonding machining operation on a portion of each of said pins from which said post is removed.

9. A method according to claim 6 in which the step of fitting said fixturing portion of each of said pins into one of the holes of said second wall comprises the step of friction fitting said fixturing portion into the hole, whereby said fixturing portion is maintained in the hole of said second wall by means of an interference fit.

10. A method according to claim 6 in which the step of fitting said fixturing portion of each of said pins into one of the holes of said second wall comprises the step of staking said fixturing portion into the hole of said second wall.

11. A method of mechanical assembly comprising the steps of:

a. providing a second wall with a hole formed therein;

b. providing a pin including a retaining portion for grasping a first wall, a fixturing portion for fitting in the hole included in said second wall, and a post portion for handling said pin;

c. fitting said fixturing portion of said pin in the hole of said second wall;

d. providing said first wall and inserting the edge of said first wall within the retaining portion of said pin; and e. bonding the assembly formed by said first and second walls and said pin.

12. A method of mechanical assembly comprising the steps of:

a. providing first and second walls to be joined, a first of said walls having an edge disposed toward a surface of said second wall, and said second wall being provided with a hole aligned with the edge of said first wall;

b. providing a pin including a retaining portion for grasping said first wall and a fixturing portion for fitting in the hole included in said second wall;

c. inserting said pin in the hole of said second wall so that said retaining portion grips said wall and said fixturing portion is fit in the hole in said second wall; and d. bonding the assembly formed by said first and second walls and said pin.

13. A method of mechanical assembly comprising the steps of:

a. providing a second wall with a hole formed therein;

b. providing a pin including a retaining portion for grasping a first wall and a fixturing portion for fitting in the hole included in said second wall;

c. fitting said fixturing portion of said pin in the hole of said second wall;

d. providing said first wall and inserting the edge of said first wall within the retaining portion of said pin; and e. bonding the assembly formed by said first and second walls and said pin.

14. A method of mechanical assembly comprising the steps of:

a. providing first and second walls to be joined, a first of said walls having an edge disposed toward a surface of said second wall;

b. providing a pin including a retaining portion for grasping said first wall, a fixturing portion for fitting in said second wall, and a post portion for handling said pin;

c. inserting said pin in said second wall so that said retaining portion grips said first wall and said fixturing portion is fit in said second wall; and d. bonding the assembly formed by said first and said second walls and said pin.

* * * * *